H. E. BRANDT.
SPRAYING DEVICE.
APPLICATION FILED AUG. 1, 1910.
1,027,521.
Patented May 28, 1912.
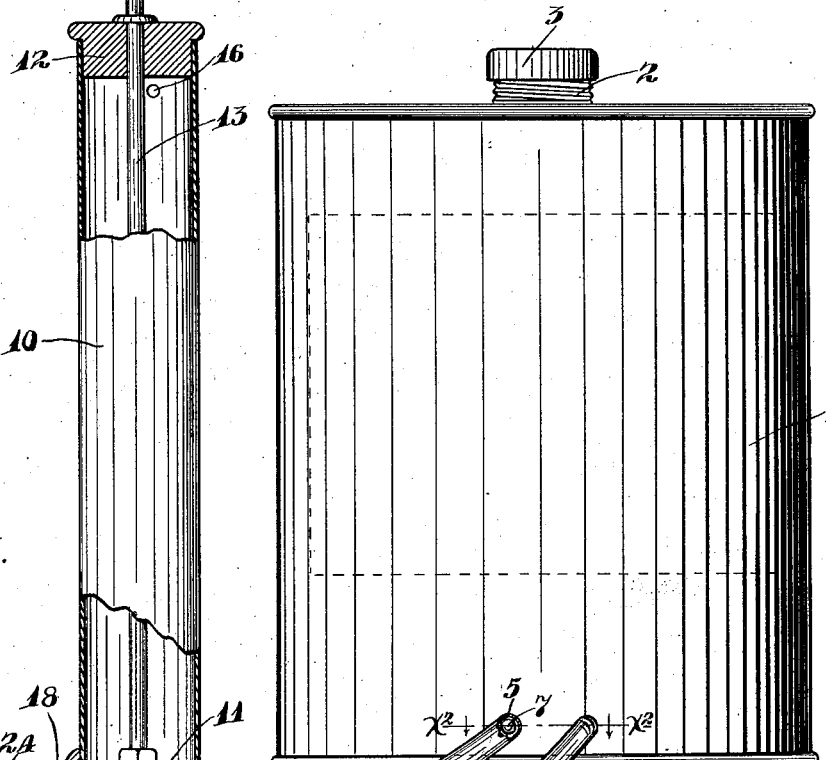
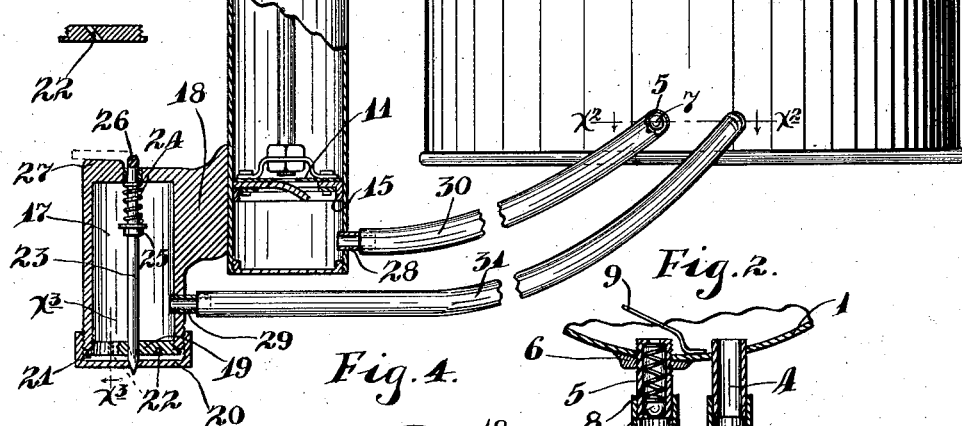
Witnesses.
Harry Opsahl.
E. C. Skinkle
Inventor:
Henry E. Brandt.
By his Attorneys.

UNITED STATES PATENT OFFICE.

HENRY E. BRANDT, OF MINNEAPOLIS, MINNESOTA.

SPRAYING DEVICE.

1,027,521.

Specification of Letters Patent.

Patented May 28, 1912.

Application filed August 1, 1910. Serial No. 574,818.

*To all whom it may concern:*

Be it known that I, HENRY E. BRANDT, a citizen of the United States, residing at Minneapolis, in the county of Hennepin and State of Minnesota, have invented certain new and useful Improvements in Spraying Devices; and I do hereby declare the following to be a full, clear, and exact description of the invention, such as will enable others skilled in the art to which it appertains to make and use the same.

My invention has for its object to provide an improved spraying device designed and intended for use in distributing poison and other insect and fungus destroying liquid over trees, brush and plants.

To such end the invention consists of the novel devices and combinations of devices hereinafter described and defined in the claims.

In the accompanying drawings, which illustrate the invention, like characters indicate like parts throughout the several views.

Referring to the drawings; Figure 1 is a view in elevation with some parts broken away and some parts sectioned, showing the improved spraying device. Fig. 2 is a detail in section on the line $x^2$ $x^2$ of Fig. 1. Fig. 3 is a detail in section on the line $x^3$ $x^3$ of Fig. 1 showing the perforated partition of the spraying head removed from working position; and Fig. 4 is a detail view in plan of the spraying head removed from the pump barrel.

The liquid containing tank 1 is preferably constructed of thin sheet metal and is air tight, but is provided on top with a filling neck 2 that is normally closed by a cap 3. At one side and close to its lower head or bottom, the tank 1 is provided with a pair of outwardly extended short tubes or nipples 4 and 5, the former of which will usually be soldered to the can while the latter will be preferably detachably secured thereto by threaded engagement with the boss or thickened surrounding portion 6 on the said tank. Both the inner and outer extremities of the nipple 5 are contracted, and the contracted outer extremity affords a seat for a valve 7 which, as shown, is in the form of a ball and is normally spring seated by a light coiled spring 8, located in the said nipple 5 and re-acting against the said ball valve and the contracted inner extremity of the said nipple.

Secured within the tank is a deflecting plate 9 which stands in front of the discharge passage in the inner end of the nipple 5 and performs an important function, presently to be described.

The customary shoulder strap with any suitable means may be provided for carrying the tank 1 from the shoulders.

The pump is made up of a cylindrical barrel 10 and a coöperating piston 11. The delivery end of the barrel 10 is closed by an air tight head, while the other end of said pump is provided with a plug 12 that affords a guide for a spring piston rod 13 which, at one end, is secured to the piston 11 and at its outer end is provided with a hand piece 14. The piston 11 is provided with a self seating leather packing 15 which, under return stroke of the piston, serves as a valve to admit the air to the compression end of the pump barrel or cylinder. In its receiving end the barrel 10 is provided with some means for the free admisison of the air, such as the perforation 16.

The hollow nozzle or body portion 17 of the spraying head is rigidly secured to the delivery end of the pump barrel 10, as shown, by means of a flange or lug 18, cast integral with the said cup and braced or riveted, or otherwise, rigidly secured to the said pump barrel. The said nozzle 17 is preferably of cylindrical form and is located with its axis parallel to the axis of the pump barrel and with its delivery end projecting beyond the delivery end of the said barrel. In its said delivery end the cylindrical body 17 is provided with a disk-like partition 19, and with a cap 20. The partition 19 has threaded engagement with the interior of the nozzle 17, while the cap 20 has an interior threaded flange screwed on to the end of the said nozzle. The partition and cap are spaced apart to afford a shallow agitating chamber 21 and the said partition 19 is provided with oblique liquid discharge passages 22 which incline circumferentially in the same direction and are adapted to set up a rotary motion of the liquid within the agitating chamber 21.

The cap 20 is provided with a single axially located discharge passage that is normally closed by a conical end of a valve 23 that works through an axial perforation in the partition 19 and through an axial perforation in the upper end of the nozzle 17. A coiled spring 24 re-acts against the upper head of the nozzle 17 and against a collar 25 on the stem of the valve 23 and normally holds the same in a position to close the axial discharge passage of the head 20. The upper end of the stem of the valve 23 is bent laterally to form a finger piece 26 which when turned on to a raised cam surface 27, formed on the upper end of the nozzle 17, forces the valve 23 into a position to open the axial discharge passage of the spraying cap 20.

The pump barrel 10, at its discharge end, is provided with a small coupling nipple 28, and the nozzle 17 is provided with a laterally projecting coupling nipple 29. The pump barrel nipple 28 is connected to the nipple 5 of the liquid containing tank 1 by a rubber hose 30, while the nipple 29 of the spraying head is connected to the nipple 4 of the tank 1 by a small rubber hose 31.

The operation of this improved spraying device is substantially as follows:—The air from the pump will be delivered directly from the delivery end of the barrel thereof, into the bottom of the tank 1 and the valve 7 will check the backward flow of air and liquid, from the tank into the hose or rubber tube 30. This valve, therefore, affords one of the pump valves and at the same time it is so located that it affords a check for preventing any liquid from flowing backward, even into the connection between the tank and pump barrel. Furthermore, the air thus discharged directly into the bottom of the tank, by impulses imparted under each operative stroke of the pump piston, will thoroughly stir up the sediment which tends to collect at the bottom of the tank. This agitating feature is highly important because most spraying solutions include materials which do not remain in solution with the water and hence will settle at the bottom of the tank, unless kept under constant agitation. The deflecting plate 9 is also important because it directs the air, immediately upon entering the tank, in a direction circumferentially of the bottom of the tank and thus tends to set up a rotation of the water in the bottom of the tank which will keep sediment washed from the entire bottom of the tank. This deflecting plate also directs the air away from the outer head nipple 4, so that it can not take a short cut and pass more or less directly out through the said nipple 4.

The air discharged into the tank will, of course, rise above the liquid to the upper portion of the tank and hence will not be discharged from the tank with the liquid. The liquid is forced from the tank under considerable pressure and out through the tube 31 and into the chamber of the nozzle or cylinder 17 of the spraying head. Whenever the valve 23 is moved into an open position the liquid, under pressure, will be forced from the main chamber of the spraying head, through the oblique perforations 22 of the partition 19, into the agitating chamber 21, where a whirling motion thereof will set up, and from thence the liquid will be discharged in a fine spray out of the axial discharge passage of the spraying cap 20.

The spraying device above described while especially intended for use in spraying germ destroying liquid is nevertheless capable of use for spraying white-wash, water paint and like material, as well as the ordinary disinfecting solutions.

What I claim is:

1. In a portable spraying device, the combination with a liquid containing tank having a receiving nipple and a discharge nipple, both opening into said tank at points near the bottom thereof, of a check valve in said receiving nipple, said receiving nipple being removable with said valve, from said tank, a hand operated pump that is portable in respect to said tank, a spraying head applied to said pump, a flexible air delivery tube connecting said pump to said valve equipped receiving nipple, and another flexible tube connecting said spraying head to the discharge nipple of said tank, substantially as described.

2. In a portable spraying device, the combination with a liquid containing tank having a receiving nipple and a discharge nipple, both opening into said tank at points near the bottom thereof, of a check valve located in the outwardly projecting portion of said receiving nipple where access may be had thereto from the exterior of the tank, a hand operated pump that is portable in respect to said tank, a spraying head applied to said pump, a flexible air delivery tube connecting said pump to the said valve-equipped receiving nipple, and another flexible tube connecting said spraying head to the discharge nipple of said tank, substantially as described.

In testimony whereof I affix my signature in presence of two witnesses.

HENRY E. BRANDT.

Witnesses:
  LORA G. HOFFMAN,
  F. D. MERCHANT.

---

Copies of this patent may be obtained for five cents each, by addressing the "Commissioner of Patents, Washington, D. C."